April 15, 1924. Re. 15,820
J. H. MUNRO
SHINGLED ROOFING
Original Filed Jan. 8, 1921
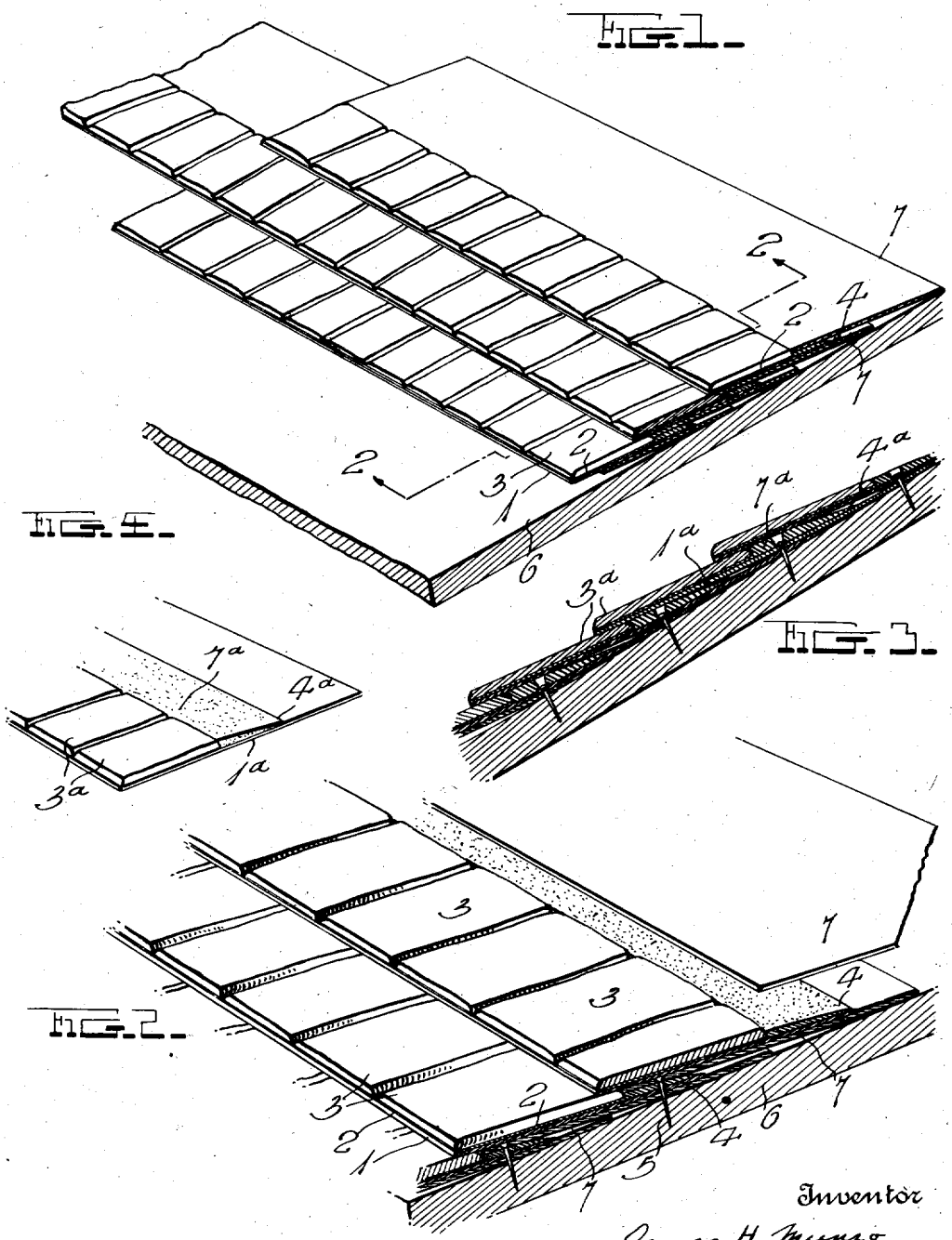
Inventor
James H. Munro
By Lester Dickinson
Attorney Reissued Apr. 15, 1924. Re. 15,820

UNITED STATES PATENT OFFICE.

JAMES H. MUNRO, OF PEN ARGYL, PENNSYLVANIA.

SHINGLED ROOFING.

Original No. 1,439,435, dated December 19, 1922, Serial No. 435,950, filed January 8, 1921. Application for reissue filed February 27, 1924. Serial No. 695,572.

*To all whom it may concern:*

Be it known that I, JAMES H. MUNRO, a citizen of the United States, residing at Pen Argyl, in the county of Northampton and State of Pennsylvania, have invented certain new and useful Improvements in Shingled Roofing; and I do declare the following to be a full, clear, and exact description of the invention, such as will enable others skilled in the art to which it appertains to make and use the same.

My invention relates to shingled roofing and has for one of its objects to provide a flexible water-proof carrying sheet for a plurality of shingles, which sheet is adapted to receive and carry off any water which drains downwardly between the shingles, thereby permitting the latter to be much shorter than usual with a corresponding reduction of expense and weight.

A further object is to provide such an arrangement as to permit the upper edge portion of the shingle carrying sheet to act as a flange by means of which the several sections of the roofing may be nailed in place, and in this connection, a further aim, is to provide a suitable layer of material on the upper surface of this flange with its upper side flush with the shingles thereby forming a support for the next upper row of shingles so as to prevent accidental breakage thereof when walking on the roof or placing other weight thereon.

With the foregoing in view, the invention resides in the novel construction and association of parts hereinafter described and claimed, the descriptive matter being supplemented by the accompanying drawings.

Figure 1 is a perspective view showing several sections of the roofing secured upon a roof.

Figure 2 is a sectional view as indicated by line 2—2 of Fig. 1.

Figure 3 is a view similar to Fig. 2 showing a modified form of construction.

Figure 4 is a detail perspective view of the form shown in Fig. 3.

In the form of construction shown in Figs. 1 and 2, the numeral 1 designates an elongated rectangular sheet of appropriate flexible water-proof material. By means of a layer 2 of any suitable non-drying flexible cement, a plurality of shingles 3 of slate or any other desired material, are secured to the upper surface of the sheet 1 with their upper ends spaced downwardly from the upper edge of the sheet so that a flange 4 is provided through which the nails 5 may be driven in attaching the roofing to the roof 6. The layer 2 of cement extends over a portion of the area of the sheet 1 and is thicker over the flange 4 than it is between the shingles and the body portion of said sheet, so that some of this cement permeates into the crevices between the shingles and abuts against the upper ends of said shingles to more effectively connect them with the sheet 1 and to prevent any rain or the like from possibly seeping in between the two.

After the sheet 1 and its shingles 3 are laid on the roof, a filling layer 7 is overlapped at its lower edge with the flange 4 or rather with the cement of said flange, the upper portion of said filling layer extending to the roof as shown. The upper surface of this sheet is flush with the upper surfaces of the shingles 3 so that the adjacent sheet 1 will lie flatly in place and its shingles will be supported against possible breakage when walking upon the roof or otherwise placing strain thereon, and it will be seen that wherever the end of one of the sheets 1 abuts the end of another sheet, the layer 7 will prevent any leakage. This layer may be constructed of any suitable material and it will be observed by reference to Fig. 2 that the nails 5 serve not only to secure the sheet 1 and shingles carried thereby on the roof, but act also to secure the layer 7 in place.

In the form of construction shown in Fig. 4 the carrying sheet $1^a$ for the shingles $3^a$ extends a greater distance beyond the upper ends of said shingles as at $4^a$ and as seen at $7^a$ the cement which is used for securing the shingles in place, forms a tapered filling layer on part of the upper side of said extending portion $4^a$ of the sheet $1^a$. This arrangement supports the shingles of the next upper row against breakage and causes them to lie flat in place as well as performing all other functions of the separate filling layer 7 above described.

By constructing the roofing sheet in the manner shown and described, it is not only an easy matter to correctly lay the roof but the shingles may be made unusually short and hence a great saving in material is effected. Even though the shingles are much shorter than usual however, no leakage will take place since the carrying sheets of the several roof sections will receive and carry off any water which flows between the shingles. Furthermore, no warmth is sacrificed by the reduction of the lengths of the shingles, in view of the addition of the heavy carrying sheets.

Since excellent results may be obtained from the details disclosed, such details may be followed if desired. I wish it understood however, that within the scope of the invention as claimed, numerous minor changes may be made.

I claim:

1. A roofing section comprising a backing of flexible water-proof material, a row of shingles adhering to the upper face of the lower portion of said backing and terminating short of the upper edge thereof, a plastic coating upon the upper face of said backing above said shingles and contacting with the upper edges of the shingles, and a sheet of flexible water-proof material extending upwardly from the upper edges of said shingles flush with the outer faces of the shingles and extending across the plastic covering and beyond the upper edge of said backing whereby the shingles will be supported against breakage under strain applied to their outer faces when in use.

2. A roofing section comprising an elongated rectangular sheet of flexible water-proof material, a row of separate fire-proof shingles cemented on said sheet and occupying the full length thereof, said sheet projecting beyond the upper edges of said shingles to provide a flange, and a filling layer applied to the upper side of said flange, the upper surface of said filling layer being flush with the upper surfaces of said shingles and being adapted to support the shingles of the next roofing section against breakage when weight is placed thereon.

3. A roofing section comprising an elongated rectangular sheet of flexible water-proof material, a layer of flexible non-drying cement on said sheet, and a row of shingles secured in place on said sheet by said cement, the shingles being spaced from the one edge of said sheet to provide a flange, the cement on said flange being thicker than elsewhere and snugly abutting the edges of the shingles.

4. A structure as specified in claim 3, the cement on said flange being flush with the upper surfaces of the shingles and being tapered to a feather edge.

5. A roofing element comprising a flexible water-proof backing, a layer of flexible cement on said backing, and a shingle affixed to said backing by said cement and being spaced from one edge of said backing to provide a flange, the cement on said flange being of greater thickness than on the remainder of the backing.

6. A roofing element comprising a flexible water-proof backing, a layer of flexible cement on said backing, and a shingle affixed to said backing by said cement and being spaced from one edge of said backing to provide a flange, the cement on said flange being tapered from the inner end of the shingle toward the opposite end of the backing.

7. A roofing element comprising a flexible water-proof backing, a shingle affixed to said backing and being spaced from an end of the backing to provide a flange, and filling means on the flange disposed between the inner end of the shingle and the opposite end of the backing.

8. A roofing element comprising a flexible water-proof backing, a shingle affixed to said backing and being spaced from an end of the backing to provide a flange, and means on the flange having a part thereof disposed flush with the upper face of the shingle to support the superimposed shingle of the next row against breakage.

9. A roofing element comprising a flexible water-proof backing, a shingle affixed to said backing and being spaced from an end of the backing to provide a flange, and means on the flange to support the superimposed shingle of the next row against breakage.

10. A roofing element comprising a flexible backing, a plastic waterproof coating on the backing, a slate affixed to the coating and spaced from one end of the backing to provide a flange, and a filler on the flange.

JAMES H. MUNRO.